United States Patent [19]
Otsuka et al.

[11] Patent Number: 5,515,034
[45] Date of Patent: May 7, 1996

[54] SIMPLE COMMUNICATION SYSTEM CAPABLE OF MESSAGE BROADCASTING

[75] Inventors: Kiyokazu Otsuka; Hiroyuki Watanabe, both of Tokyo, Japan

[73] Assignee: NEC Corporation, Tokyo, Japan

[21] Appl. No.: 264,945

[22] Filed: Jun. 24, 1994

[30] Foreign Application Priority Data

Jun. 24, 1993 [JP] Japan .................. 5-153752

[51] Int. Cl.[6] ............................................. G05B 23/02
[52] U.S. Cl. .................. 340/825.07; 340/825.47
[58] Field of Search .................. 340/825.07, 825.44, 340/825.52, 825.47; 379/96, 97, 98; 455/49.1, 51.2

[56] References Cited

U.S. PATENT DOCUMENTS

| | | | |
|---|---|---|---|
| 4,131,881 | 12/1978 | Robinson | 340/825.47 |
| 4,922,524 | 5/1990 | Baba et al. | 379/96 |
| 4,991,197 | 2/1991 | Morris | 379/98 |
| 5,008,926 | 4/1991 | Misholi | 379/96 |
| 5,257,112 | 10/1993 | Okada | 379/97 |
| 5,311,570 | 5/1994 | Grimes et al. | 340/825.44 |
| 5,315,642 | 5/1994 | Fernandez | 379/96 |

FOREIGN PATENT DOCUMENTS

| | | | |
|---|---|---|---|
| 59-154848 | 9/1984 | Japan | H04L 11/18 |
| 60-140956 | 7/1985 | Japan | H04L 11/20 |
| 62-137945 | 6/1987 | Japan | H04L 13/00 |
| 63-129737 | 6/1988 | Japan | H04J 3/00 |
| 22776 | 1/1990 | Japan | H04L 29/06 |
| 234062 | 2/1990 | Japan | H04L 12/66 |

*Primary Examiner*—Donald J. Yusko
*Assistant Examiner*—Edward Merz
*Attorney, Agent, or Firm*—Sughrue, Mion, Zinn, Macpeak & Seas

[57] ABSTRACT

In a communication system for a plurality of terminals, a terminal control unit is connected between a call control unit and the terminals. The terminal control unit is associated with a memory unit having a group supervisory table for storing a relationship between group numbers and the terminals belonging thereto for message broadcasting. When a destination call message is supplied from the call control unit to the terminal control unit, a group number is analyzed from the destination call message. Then, a number of the terminals belonging to the analyzed group number are selected in accordance with the group supervisory table, and message broadcasting is performed upon the selected terminals.

7 Claims, 7 Drawing Sheets

SIMPLE COMMUNICATION SYSTEM CAPABLE OF MESSAGE BROADCASTING

BACKGROUND OF THE INVENTION

1. Field of the Invention

The present invention relates to a simple communication system capable of message broadcasting, and more particularly, to a terminal control system in an integrated services digital network (ISDN) exchange system, for example.

2. Description of the Related Art

In a prior art ISDN exchange system, a plurality of terminals are connected to a call control unit which is also connected to a plurality of supplementary service units such as a transfer service unit and a call-waiting service unit. In this ISDN exchange system, there is provided a memory unit having a group supervisory table for storing a relationship between group numbers and the terminals belonging thereto for message broadcasting. When a destination call message supplied to the call control unit includes supplementary services, the corresponding supplementary service unit carries out a message broadcasting operation in accordance with the group supervisory table. This will be explained later in detail.

In the above-mentioned prior art ISDN exchange system, however, since each of the supplementary service units needs to incorporate a grouping function for message broadcasting using the group supervisory table, the entire ISDN exchange system becomes complex.

SUMMARY OF THE INVENTION

It is an object of the present invention to provide a simple communication system capable of message broadcasting.

According to the present invention, in a communication system for a plurality of terminals, a terminal control unit is connected between a call control unit and the terminals. The terminal control unit is associated with a memory unit having a group supervisory table for storing a relationship between group numbers and the terminals belonging thereto for message broadcasting. When a destination call message is supplied from the call control unit to the terminal control unit, a group number is analyzed from the destination call message. Then, a number of the terminals belonging to the analyzed group number are selected in accordance with the group supervisory table, and message broadcasting is performed upon the selected terminals. Thus, since a message broadcasting function is concentrated at the terminal control unit, the communication system can be simplified.

BRIEF DESCRIPTION OF THE DRAWINGS

The present invention will be more clearly understood from the description as set forth below, with reference to the accompanied drawings, wherein.

DESCRIPTION OF THE PREFERRED EMBODIMENTS

Before the description of the preferred embodiments, a prior art communication system will be explained with reference to FIG. 1.

Figure 1:
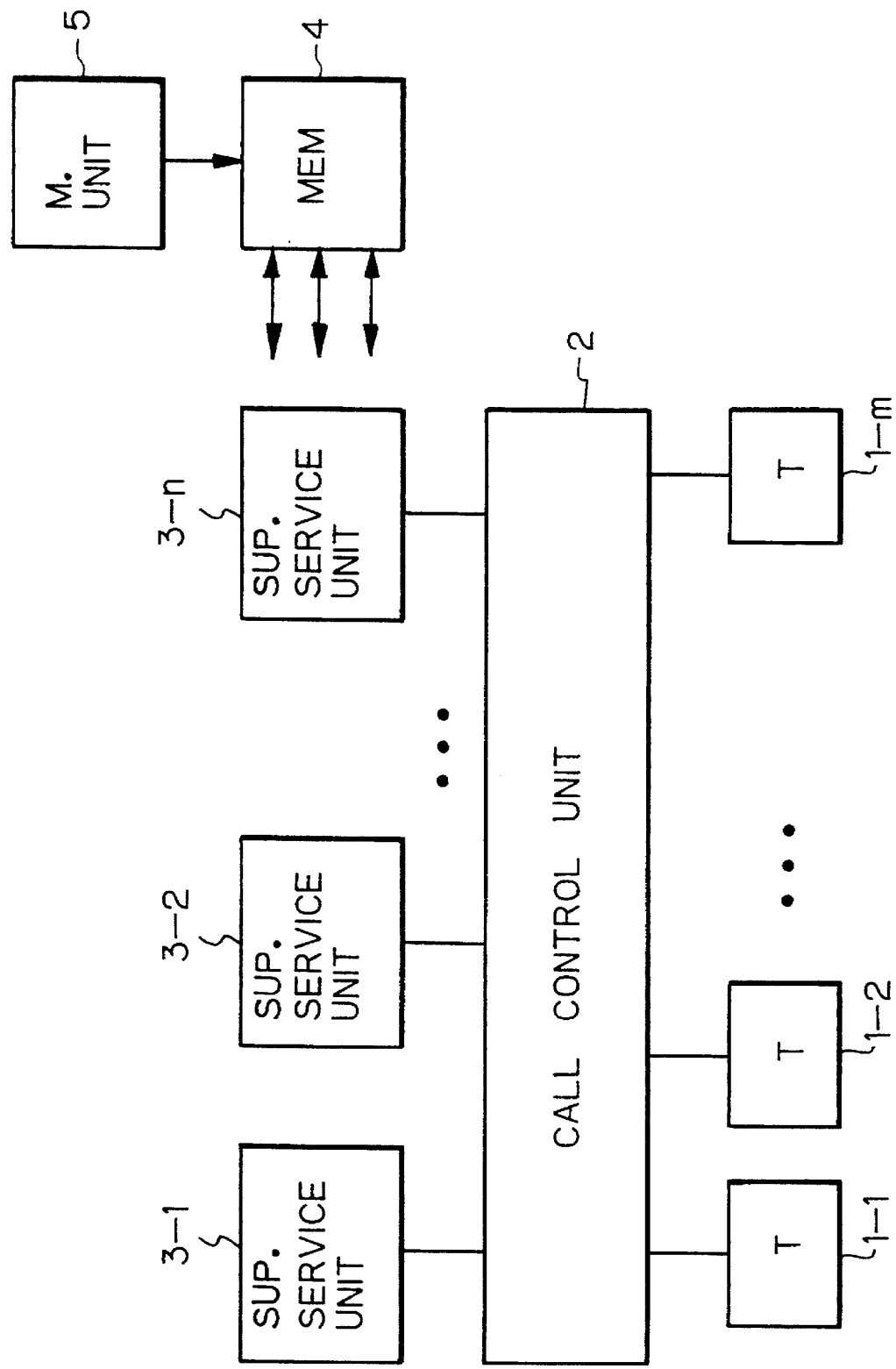
FIG. 1 is a block diagram illustrating a prior art communication system.

In FIG. 1, a plurality of terminals 1-1, 1-2, ..., 1-m such as facsimile machines are connected to a call control unit 2 which is also connected to a plurality of supplementary service units 3-1, 3-2, ..., 3-n, such as a transfer service unit and a call-waiting service unit. Also, reference numeral 4 designates a memory unit having a group supervisory table for storing a relationship between group numbers and the terminals belonging thereto. The content of the group supervisory table is adjusted or written by an operator using a maintenance unit 5. When a destination call message is supplied from one of the terminals 1-1, 1-2, ..., 1-m to the call control unit 2, the call control unit 2 carries out a call control operation, In this case, if the destination call message includes a supplementary service, the call control unit 2 carries out such an supplementary service in addition to the basic call control operation. This necessitates each of the supplementary service units 3-1, 3-2, ..., 3-n having a grouping function for message broadcasting.

Figure 2:
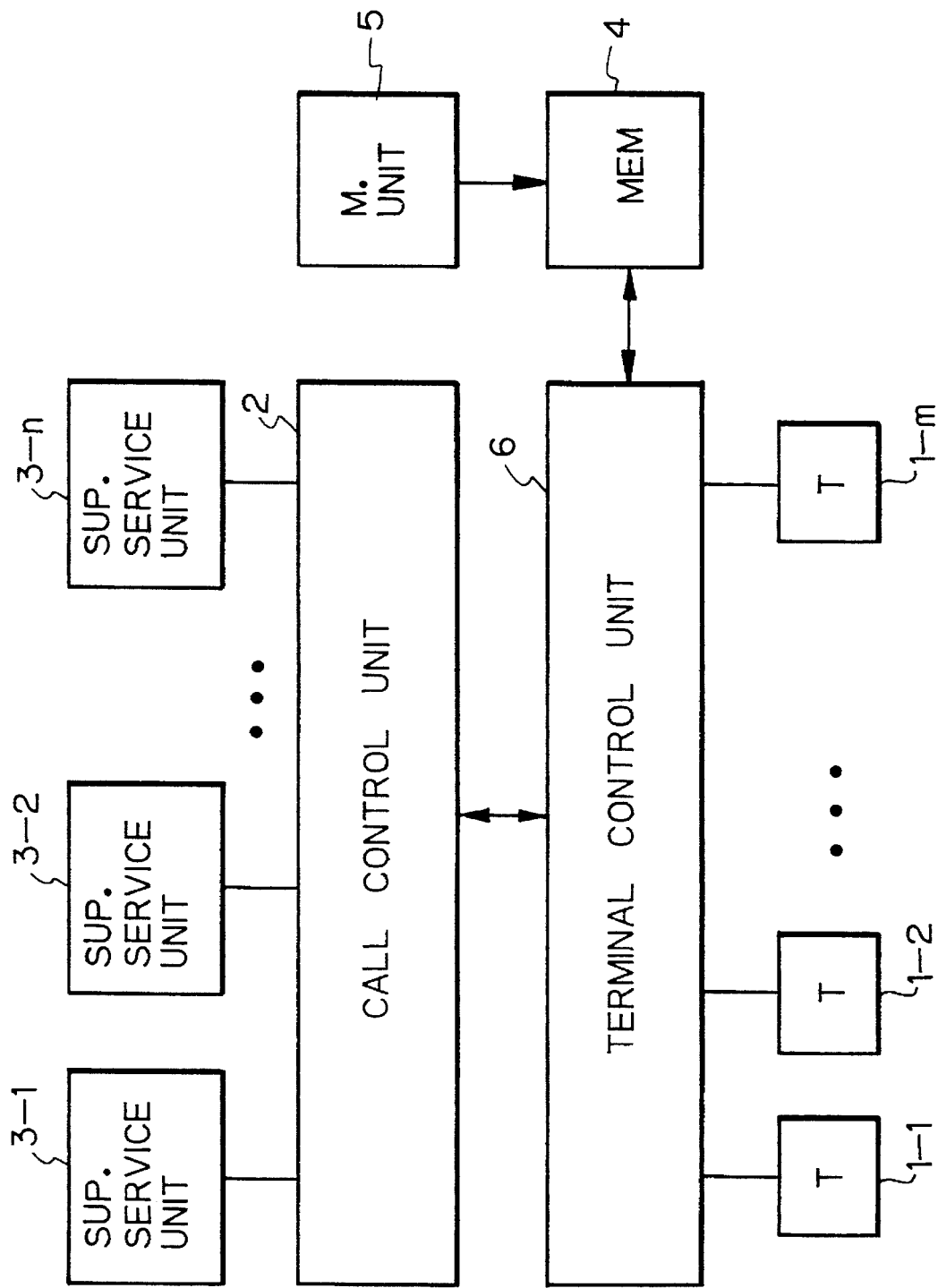
FIG. 2 is a block diagram illustrating an embodiment of the communication system according to the present invention.

In FIG. 2, which illustrates an embodiment of the present invention, a terminal control unit 6 is added to the elements of FIG. 1. The memory unit 4 is connected to the terminal control unit 6. That is, a grouping function for multiple addressing is concentrated at the terminal control unit 6, not at the supplementary service unit 3-1, 3-2, ..., 3-n.

Figure 3:
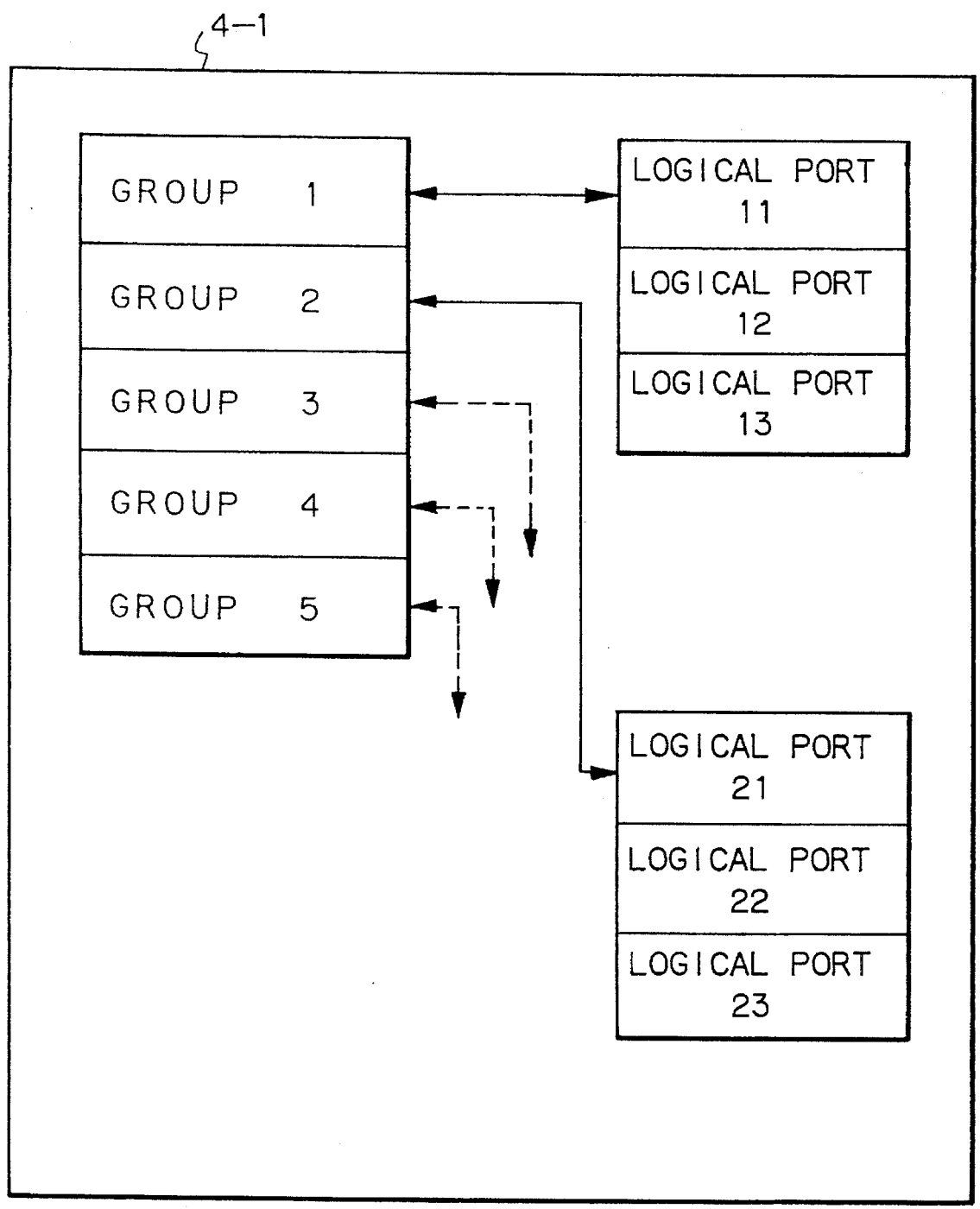
FIG. 3 is a diagram schematically showing the content of the group supervisory table of the memory unit of FIG. 2.

The memory unit 4 has a group supervisory table 4-1 as shown in FIG. 3. That is, all of the terminals 1-1, 1-2, ..., 1-m are divided into a plurality of groups: group 1, group 2, ..., and group 5. In this case, logical ports location numbers (hereinafter, simply referred to as logical ports) are allocated to the terminals. For example, logical ports 11, 12 and 13 are allocated to the three terminals belonging to the group 1, and logical ports 21, 22 and 23 are allocated to the three terminals belonging to the group 2. This allocation of the logical ports is carried out by the maintenance unit 5. Also, in this case, a relationship between the logical ports and physical port numbers (hereinafter, simply referred to as physical ports) of the terminals 1-1, 1-2, ..., 1-m is registered in a resource unit (not shown).

Figure 4A:
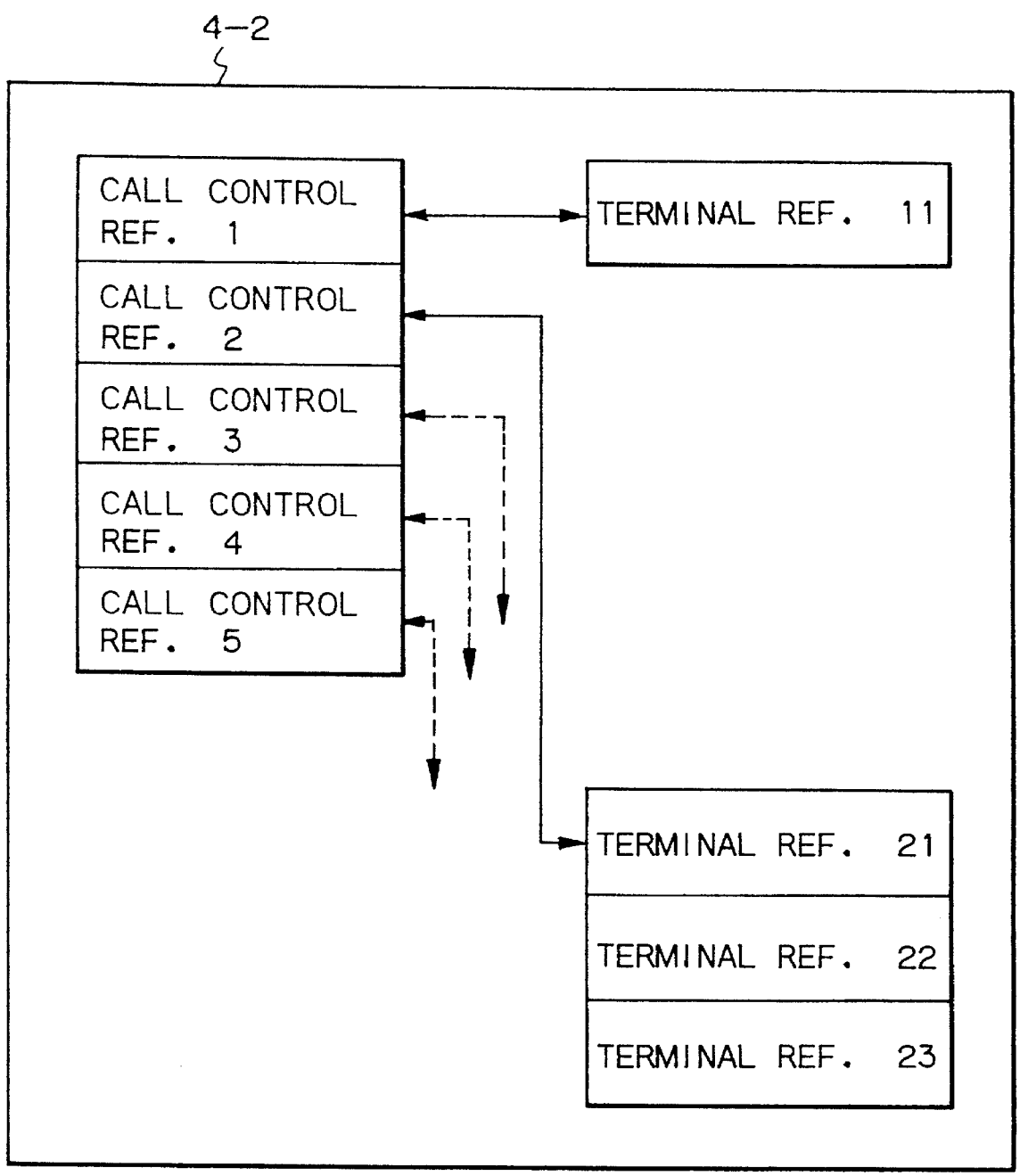
FIGS. 4A and 4B are diagrams schematically showing contents of the call reference conversion table of the memory unit of FIG. 2.
Figure 4B:
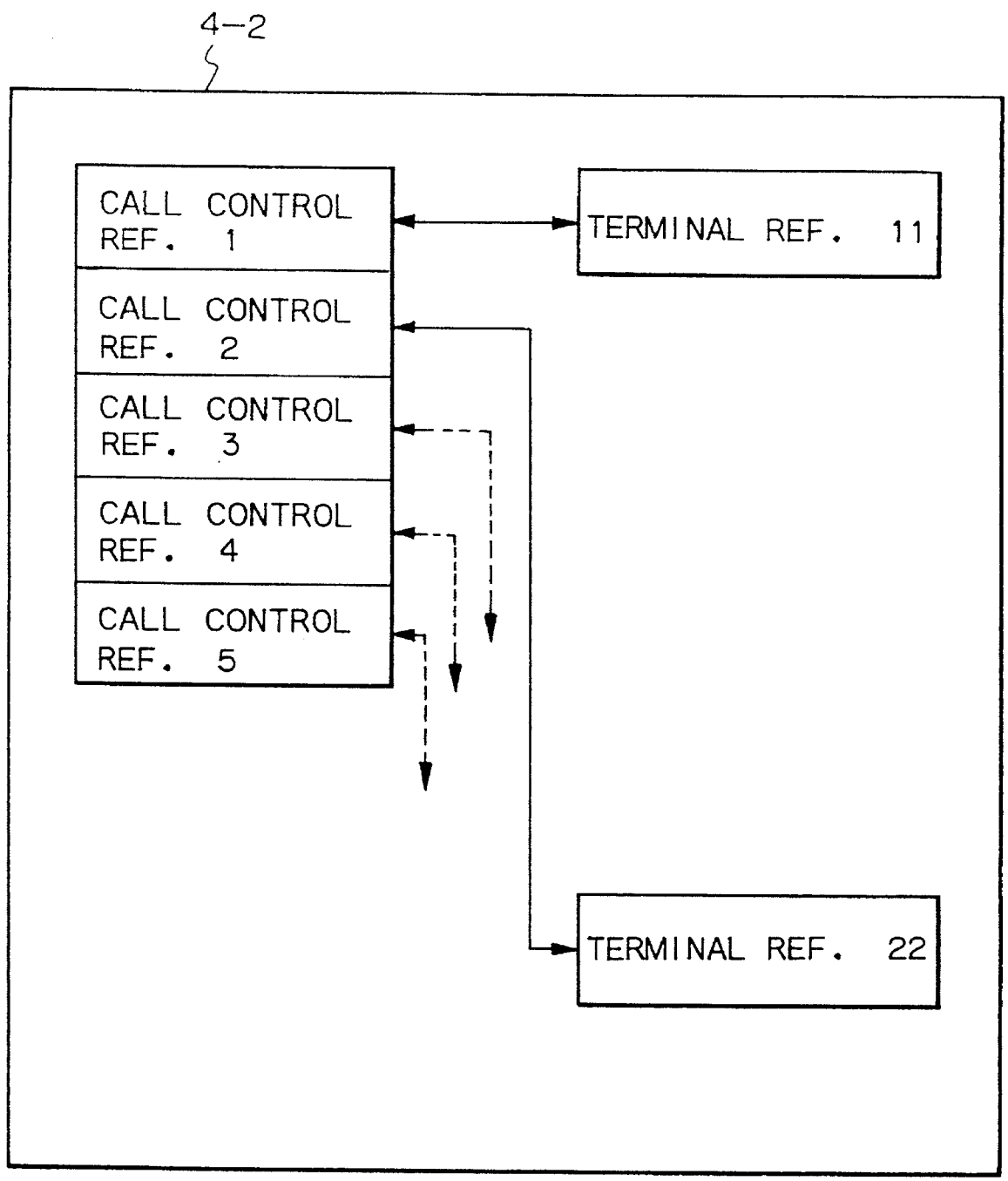

Also, the memory unit 4 has a call control call reference conversion table 4-2 as shown in FIGS. 4A and 4B. That is, during a call control operation, terminal call references are allocated to calls corresponding to logical ports. Note that the call control call references 1, 2, ..., 5 correspond to the groups 1, 2, ..., 5, respectively, of FIG. 3. For example, as shown in FIG. 4A, terminal call references 21, 22 and 23 are allocated to calls corresponding to the logical ports 21, 22 and 23, respectively and as shown in FIG. 4B, a terminal call reference 22 is allocated to a call corresponding to the logic location 22.

Figure 5:
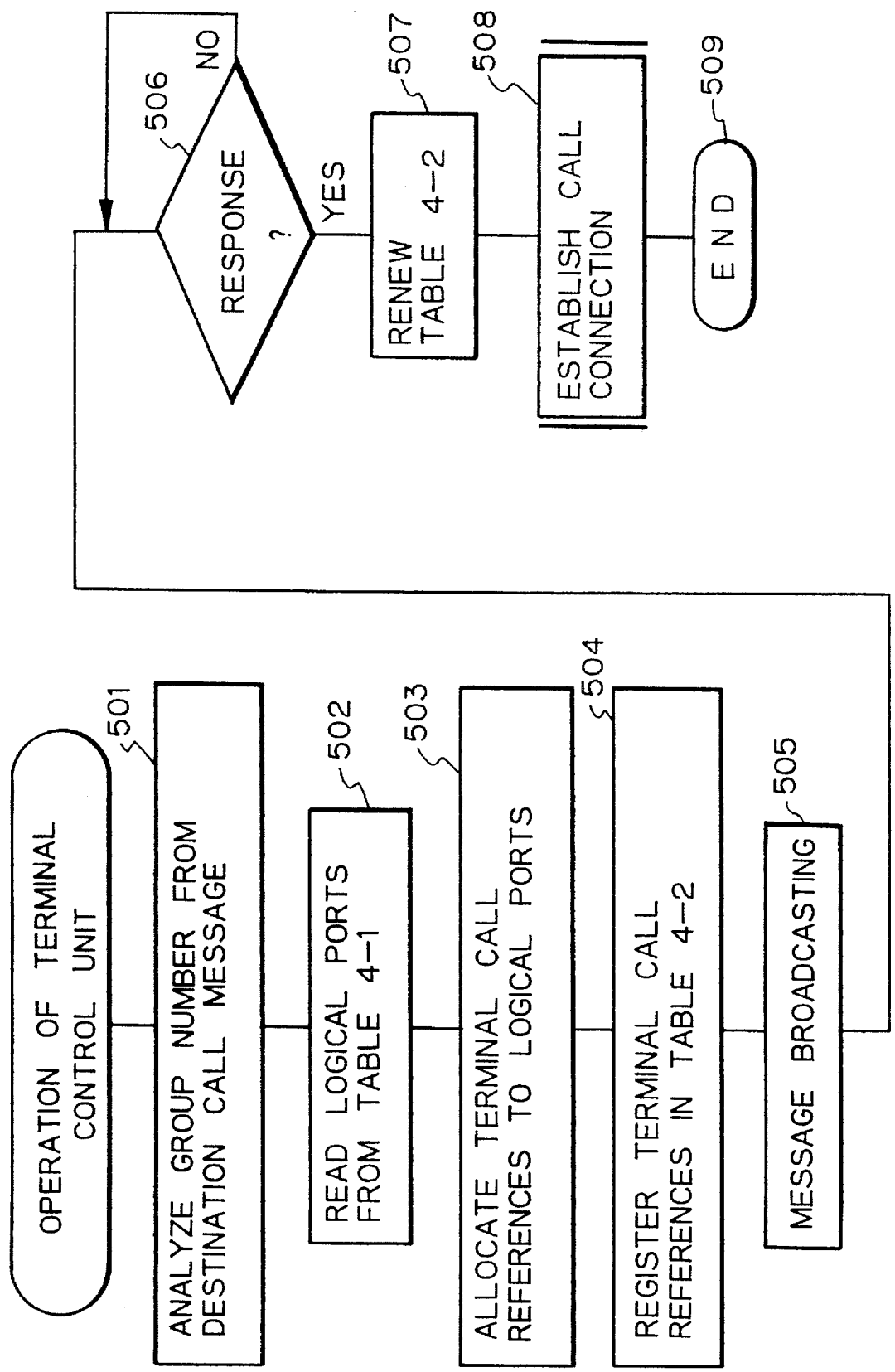
FIGS. 5 is a flowchart showing the operation of the terminal control unit of FIG. 2.

The operation of the terminal control unit 6 of FIG. 2 will be explained next with reference to FIG. 5. In this case, assume that one of the terminals issues a call request via the terminal unit 6 to the call control unit 2, and as a result, the call control unit 2 generates a destination call message and transmits it to the terminal control unit 6.

At step 501, the terminal control unit 6 analyzes a group number from the destination call message.

Next, at step 502, the terminal control unit 6 selects a number of the logical ports belonging to the analyzed group number in accordance with the group supervisory table 4-1 as shown in FIG. 3. For example, if the analyzed group number is 2, the logical ports 21, 22 and 23 are selected. In this case, the terminals having the logical ports 21, 22 and 23 should be addressed by broadcasting operation.

Next, at step 503, the terminal control unit 6 allocates terminal call references to the logical ports selected at step 502. For example, terminal call references 21, 22 and 23 are allocated to calls corresponding to the selected logical ports.

Next, at step 504, the terminal control unit 6 registers the allocated terminal call references in the call reference conversion table 4-2. For example, as shown in FIG. 4A, the terminal call references 21, 22 and 23 allocated by calls corresponding to the logical ports 21, 22 and 23 are registered.

Next, at step 505, the terminal control unit 6 performs a message broadcasting operation upon the terminals at calls corresponding to the logical ports 21, 22 and 23.

Next, at step 506, the terminal control unit 6 awaits a response from any one of the terminals at the logical ports 21, 22 and 23.

After the terminal control unit 6 receives a response, at step 507, the terminal control unit 6 renews the call reference conversion table 4-2. For example, as shown in FIG. 4B, after the terminal control unit 6 receives a response from the terminal at logic location 22, a correspondence between the call control call reference 2 and the terminal call reference 22 is retained, while correspondences between the call control call reference 2 and the terminal call references 21 and 23 are deleted.

Next, at step 508, a call connection between the call request terminal and the responding terminal is established.

Then, this routine is completed by step 509.

Figure 6:
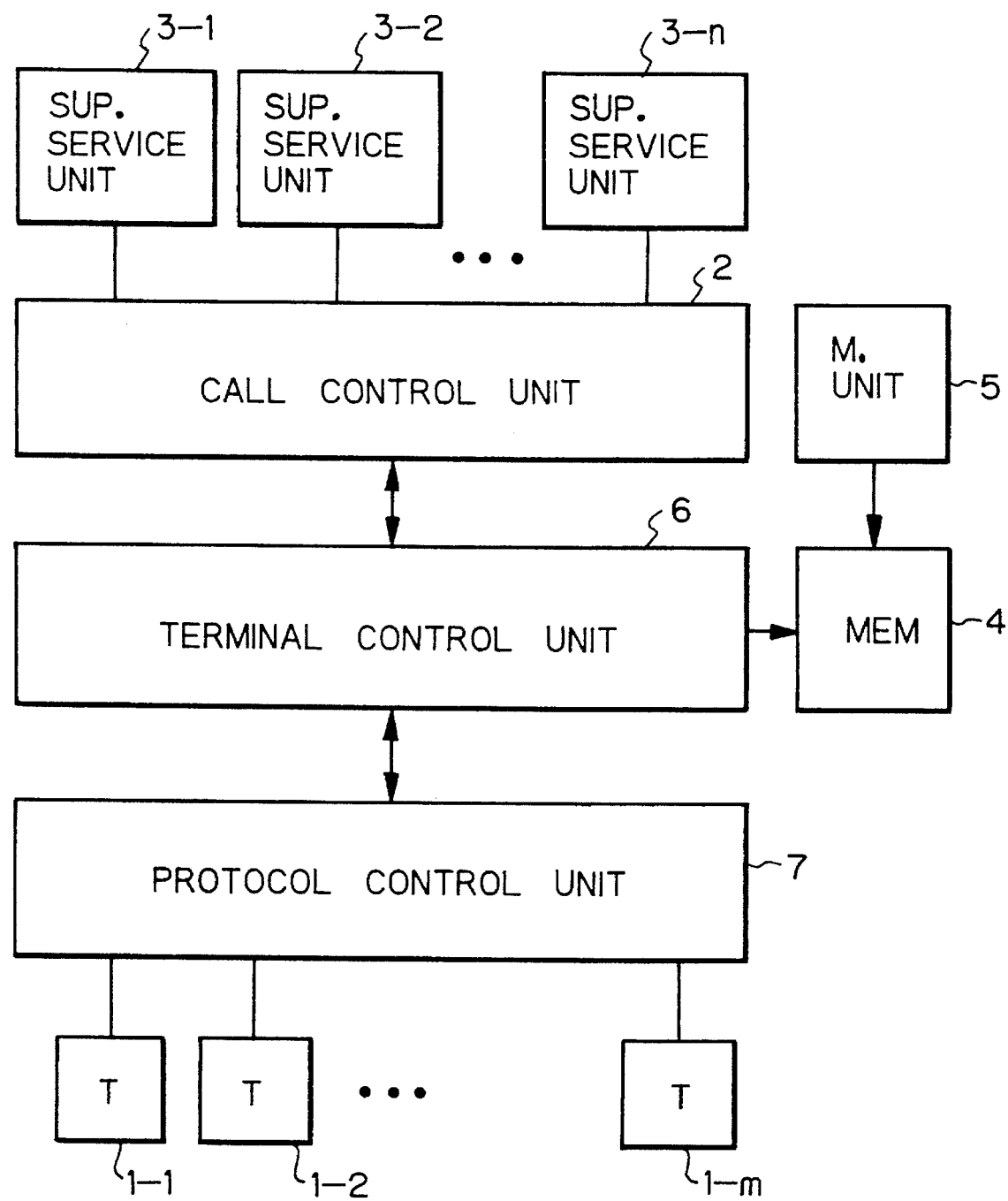
FIG. 6 is a block diagram illustrating another embodiment of the communication system according to the present invention.

In FIG. 6, which illustrates another embodiment of the present invention, a protocol control unit 7 for carrying out a protocol conversion is provided between the terminal control unit 6 and the terminals 1-1, 1-2, . . . , 1-m of FIG. 2. If all of the terminals 1-1, 1-2, . . . , 1-m have the same protocol, the protocol control unit 7 can be included in the terminal control unit 6.

Also, the call control unit 2, the supplementary service unit 3-1, 3-2, . . . , 3-n, the memory unit 4, the terminal control unit 6, and the protocol control unit 7 are constructed as an ISDN exchange system.

As explained hereinbefore, according to the present invention, since a message broadcasting function is concentrated at the terminal control unit, not at the supplementary service units, the communication system can be simplified.

We claim:

1. A communication system for a plurality of terminals, comprising:

a terminal control unit connected to said terminals;

a call control unit connected to said terminal control unit; and a memory unit having a group supervisory table for storing a relationship between group numbers and said terminals belonging to said group numbers, said terminal control unit comprising:

means for analyzing a group number from a destination call message supplied from said call control unit; and means for selecting a number of said terminals belonging to an analyzed group number in accordance with said group supervisory table and performing a message broadcasting operation on the number of said terminals.

2. A system as set forth in claim 1, wherein said memory unit further has a call reference conversion table for storing a relationship between call control call references and terminal call references belonging to said call control call references.

3. A system as set forth in claim 2, wherein said terminal control unit further comprises:

means for allocating terminal call references to calls corresponding to the port number of said terminals belonging to the analyzed group number; and means for registering the terminal call references in said call reference conversion table by making the analyzed group number correspond to a call reference.

4. A system as set forth in claim 3, wherein said terminal control unit further comprises:

means for receiving a response from one of the port numbers of said terminals upon which message broadcasting operation was performed; and means for renewing said call reference conversion table by making one of the terminal call references correspond to one of said terminals which generates the response.

5. A system as set forth in claim 1, further comprising a plurality of supplementary service units connected to said call control unit.

6. A system as set forth in claim 1, further comprising a protocol control unit connected between said terminal control units and said terminals.

7. A system as set forth in claim 1, being constructed as an ISDN exchange system.

\* \* \* \* \*